(12) United States Patent
Murata

(10) Patent No.: US 9,919,710 B2
(45) Date of Patent: Mar. 20, 2018

(54) POWER STORAGE SYSTEM

(71) Applicant: TOYOTA JIDOSHA KABUSHIKI KAISHA, Toyota-shi, Aichi-ken (JP)

(72) Inventor: Takashi Murata, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/023,217

(22) PCT Filed: Sep. 22, 2014

(86) PCT No.: PCT/IB2014/001889
§ 371 (c)(1),
(2) Date: Mar. 18, 2016

(87) PCT Pub. No.: WO2015/044739
PCT Pub. Date: Apr. 2, 2015

(65) Prior Publication Data
US 2016/0229411 A1    Aug. 11, 2016

(30) Foreign Application Priority Data
Sep. 24, 2013 (JP) ................................. 2013-196645

(51) Int. Cl.
*B60W 30/192* (2012.01)
*B60L 11/12* (2006.01)
(Continued)

(52) U.S. Cl.
CPC .......... *B60W 30/192* (2013.01); *B60L 11/123* (2013.01); *B60L 11/1816* (2013.01);
(Continued)

(58) Field of Classification Search
CPC .... B60W 30/192; B60W 10/06; B60W 10/08; B60W 10/26; B60W 20/13;
(Continued)

(56) References Cited

U.S. PATENT DOCUMENTS

2003/0162084 A1    8/2003   Shigeta et al.
2005/0264257 A1   12/2005   Inui
(Continued)

FOREIGN PATENT DOCUMENTS

CN          1435909 A        8/2003
CN        101888940 A       11/2010
(Continued)

*Primary Examiner* — Mussa A Shaawat
*Assistant Examiner* — Michael V Kerrigan
(74) *Attorney, Agent, or Firm* — Oliff PLC

(57) ABSTRACT

The invention provides a power storage system of a hybrid vehicle in which a battery can be charged with electric power supplied from an external power supply. The power storage system includes an engine heater and a battery heater, a DC/DC converter that converts a voltage of input power and outputs the power to the engine heater and the battery heater, respectively, a charger connected to the external power supply and operable to outputs power supplied from the external power battery to the battery and the DC/DC converter, and a controller that performs external charge control for charging the battery with power supplied from the external power supply, and temperature regulation control for raising the temperatures of the engine and the battery, by supplying power from the external power supply to the engine heater and the battery heater via the DC/DC converter, until the external charge control ends.

6 Claims, 8 Drawing Sheets

(51) Int. Cl.
  *B60L 11/18* (2006.01)
  *B60W 20/13* (2016.01)
  *B60W 10/06* (2006.01)
  *B60W 10/08* (2006.01)
  *B60W 10/26* (2006.01)

(52) U.S. Cl.
  CPC .......... *B60L 11/1861* (2013.01); *B60W 10/06* (2013.01); *B60W 10/08* (2013.01); *B60W 10/26* (2013.01); *B60W 20/13* (2016.01); *B60W 2710/0688* (2013.01); *B60W 2710/246* (2013.01); *Y02T 10/6217* (2013.01); *Y02T 10/7005* (2013.01); *Y02T 10/705* (2013.01); *Y02T 10/7044* (2013.01); *Y02T 10/7077* (2013.01); *Y10S 903/93* (2013.01)

(58) Field of Classification Search
  CPC ..... B60W 2710/0688; B60W 2710/246; B60L 11/1816; B60L 11/123; B60L 11/1861; Y10S 903/93; Y02T 10/6217; Y02T 10/705; Y02T 10/7005; Y02T 10/7044; Y02T 10/7077
  See application file for complete search history.

(56) References Cited

U.S. PATENT DOCUMENTS

| | | |
|---|---|---|
| 2010/0222952 A1 | 9/2010 | Yamaguchi |
| 2011/0153140 A1* | 6/2011 | Datta ...................... B60R 16/02 |
| | | 701/31.4 |
| 2011/0241859 A1 | 10/2011 | Handa |
| 2012/0185120 A1 | 7/2012 | Miyazaki |
| 2013/0041543 A1 | 2/2013 | Takayanagi et al. |
| 2013/0093394 A1 | 4/2013 | Iyasu et al. |
| 2014/0180519 A1 | 6/2014 | Niimi |

FOREIGN PATENT DOCUMENTS

| | | |
|---|---|---|
| CN | 102958775 A | 3/2013 |
| EP | 2221208 A1 | 8/2010 |
| JP | 2005-339980 A | 12/2005 |
| JP | 2008-126970 A | 6/2008 |
| JP | 2011-259672 A | 12/2011 |
| JP | 2012-016239 A | 1/2012 |
| JP | 2012-252907 A | 12/2012 |
| JP | 2013-103660 A | 5/2013 |
| JP | 2013-119349 A | 6/2013 |
| WO | 2013/038492 A1 | 3/2013 |

\* cited by examiner

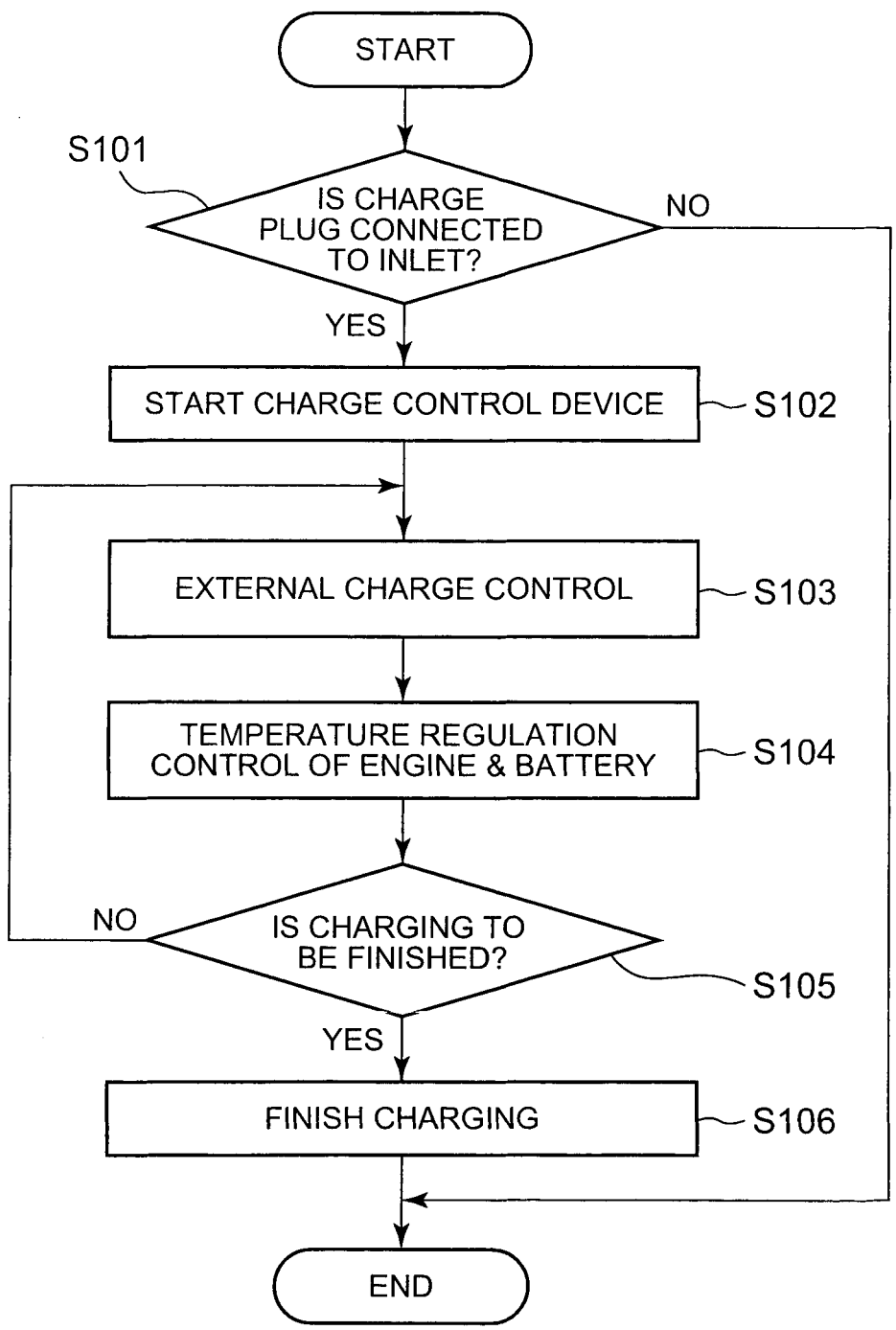

POWER STORAGE SYSTEM

BACKGROUND OF THE INVENTION

1. Field of the Invention

The invention relates to a power storage system of a hybrid vehicle including a motor driven with electric power supplied from a battery, and an engine, wherein the battery can be charged with electric power supplied from an external power supply.

2. Description of Related Art

A hybrid vehicle includes a motor and an engine as driving sources for running the vehicle. The hybrid vehicle is able to run using one or both of the engine and the motor, as the driving source(s).

In recent years, plug-in hybrid vehicles appeared, in which a battery that supplies electric power to a motor can be charged with electric power supplied from an external power supply. In a plug-in hybrid vehicle as described in Japanese Patent Application Publication No. 2013-119349 (JP 2013-119349 A), when the vehicle runs after completion of charging using the external power supply, vehicle control is performed in a running mode (CD mode) in which electric power stored in the battery is positively used until the state of charge (SOC) of the battery is reduced to a given value, while curbing or reducing the frequency of driving the vehicle, thus assuring improved fuel efficiency. To improve the fuel efficiency, it is necessary to curb or reduce the frequency of driving the engine while the vehicle is running in the CD mode.

In a system as described in Japanese Patent Application Publication No. 2008-126970 (JP 2008-126970 A), the engine is heated during external charging so that the temperature of the engine (the temperature of the engine coolant) is increased. With the engine thus heated in advance during external charging, the engine is less likely or unlikely to be driven for warm-up during vehicle running.

In a vehicle control system as described in Japanese Patent Application Publication No. 2011-259672 (JP 2011-259672 A), the battery is heated during external charging so that the temperature of the battery is increased. The output characteristics of the battery depend on the temperature, and the output of the battery is reduced if the temperature of the battery is lower than an appropriate temperature range. If the output of the battery is reduced, the engine is more likely to be driven so as to make up for the required output of the vehicle, for example. Therefore, the temperature of the battery is raised to the appropriate temperature range during external charging, so that the output of the battery is less likely or unlikely to be reduced, and the frequency of driving the engine is curbed or reduced.

Thus, in order to improve the fuel efficiency through running control in the CD mode after completion of charging using the external power supply, it is necessary to curb or reduce the frequency of driving the engine, by warming the engine and the battery through temperature control during external charging.

SUMMARY OF THE INVENTION

However, since electric power supplied from the external power supply is used for temperature control of the engine and the battery, the cost of charging with the external power supply is increased by the amount of power required for temperature control.

More specifically, the system as described above includes a DC/DC converter that converts voltage of electric power supplied from the external power supply and supplies the power to a heater for the engine and a heater for the battery, a control device that performs external charge control, and a control device that controls supply of power to the heaters. The power consumed by the DC/DC converter, control devices, etc., is included in the cost of external charging. Also, a power loss occurs when the DC/DC converter performs voltage conversion, and the loss is further added to the charging cost.

Accordingly, the power consumed by the DC/DC converter, control devices, etc. and the power loss of the DC/D converter are required to be curbed or reduced, from the viewpoint of reduction of the charging cost, but had not been taken into consideration in conventional systems.

The invention provides a power storage system of a hybrid vehicle including temperature control devices of an engine and a battery and capable of charging the battery with electric power supplied from an external power supply, wherein the charging cost for operating the temperature control devices of the engine and the battery using external electric power, while charging the battery with the external power, is curbed or reduced A power storage system according to one aspect of the invention includes an external power supply, and a hybrid vehicle including an engine, a motor, a battery that supplies electric power to the motor, the battery being configured to be charged with the electric power supplied from the external power supply, an engine heater that rises a temperature of the engine, a battery heater that rises a temperature of the battery, a first DC/DC converter configured to convert a voltage of the electric power supplied the first DC/DC converter, and the first DC/DC converter being configured to output the electric power to the engine heater and the battery heater respectively, a charger connected to the external power supply and the charger configured to output the electric power supplied from the external power supply to the battery and the first DC/DC converter, and a first controller configured to perform external charge control and temperature regulation control, the external charge control being a control to charge the battery with the electric power supplied from the external power supply, the temperature regulation control being a control to supply the electric power supplied from the external power supply to the engine heater and the battery heater via the first DC/DC converter until the external charge control is finished, thereby to rise temperatures of the engine and the battery.

According to the above aspect of the invention, the common, single DC/DC converter operates to supply electric power to the two heaters, i.e., the engine heater and the battery heater, and the external charge control of the battery and the temperature regulation control including control for supplying the power to the engine heater and the battery heater are carried out by the single controller.

Thus, the number of the DC/DC converter and controller that operate during external charging is minimized, so that power consumption needed to operate the DC/DC converter and the controller during external charging can be reduced. Also, a power loss caused by voltage conversion can be reduced, as compared with the case where DC/DC converters are provided for the engine heater and the battery heater, respectively.

Accordingly, the power consumed for operating the DC/DC converter and the controller during external charging and the power loss caused by voltage conversion can be reduced, and the amount of electric power (external charging cost) required to raise the temperatures of the engine and the battery by operating the engine heater and the battery heater using external power, while charging the battery with the external power, can be curbed or reduced.

In the power storage system, the hybrid vehicle may further include a second DC/DC converter configured to convert a voltage of electric power supplied from the battery, and the second DC/DC converter configured to output the electronic power to an inverter connected to the motor, and a second controller configured to perform charge/discharge control of the battery via the second DC/DC converter. The charger may be connected between a system main relay that permits connection between the second DC/DC converter and the battery, and the battery. The first controller may be configured to perform the external charge control and the temperature regulation control when i) the system main relay is in an OFF state and ii) the second DC/DC converter and the second controller are not started. With this arrangement, the external charging and the temperature control of the engine, etc. are performed by starting only the external charge system including the charger and the DC/DC converter; therefore, the power consumption of the charge/discharge system that supplies power from the battery to the motor can be curbed or reduced, and the external charging cost can be curbed or reduced.

In the power storage system as described above, the first controller may set a target temperature of the engine based on an amount of temperature reduction of the engine which is specified in advance according to a vehicle speed during vehicle running, such that the temperature of the engine does not become lower than a predetermined threshold value at which the engine is forced to be driven, until the vehicle running ends after completion of charging with the external power supply. With this arrangement, the engine is less likely or unlikely to be forced to be driven during vehicle running after external charging, and the fuel efficiency can be improved. Also, since the target temperature is set by predicting the amount of temperature reduction of the engine, the power supplied to the engine heater can be controlled to the minimum in accordance with the target temperature for curbing forced driving of the engine during vehicle running.

In the power storage system as described above, the hybrid vehicle may be adapted to run in one of a first running mode and a second running mode. The first running mode is a running mode mainly using the motor while charging or discharging the battery until an amount of charge of the battery becomes equal to a predetermined value such that the amount of charge of the battery is reduced due to power consumption caused by vehicle running. The second running mode is a running mode using the engine and the motor while charging or discharging the battery such that the amount of charge of the battery becomes equal to a predetermined target value. The first control may set the target temperature, such that the temperature of the engine does not become lower than the predetermined threshold value at which the engine is forced to be driven, until the vehicle running in the first running mode after completion of charging with the external power supply ends. At this time, the first controller may set the target temperature, based on the amount of temperature reduction associated with a maximum vehicle speed specified in advance in the first running mode. With this arrangement, the vehicle can run in the first running mode after external charging, without forcing the engine to be driven.

The first controller may set the target temperature, based on the amount of temperature reduction corresponding to an average vehicle speed calculated from a history of past vehicle running. With this arrangement, the vehicle can run in the first running mode after external charging, without forcing the engine to be driven.

The first controller may set the target temperature, based on one of the amount of temperature reduction, an estimated value of a lowest ambient temperature set in advance, and an actual value of the lowest ambient temperature detected by a temperature sensor. With this arrangement, the target temperature for curbing forced driving of the engine during running of the vehicle after external charging can be set with high accuracy, according to the lowest ambient temperature.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a flowchart illustrating the processing flow of external charge control including temperature regulation control of an engine and a battery according to the first embodiment;

DETAILED DESCRIPTION OF EMBODIMENTS

Figure 1:
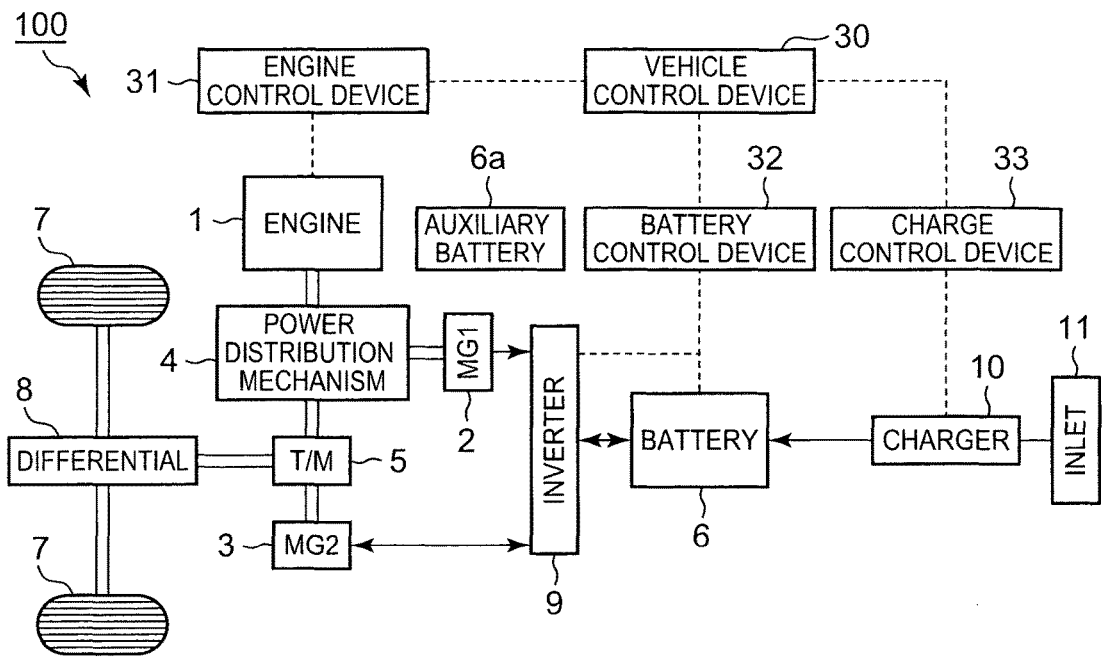
FIG. 1 is a block diagram showing the configuration of a hybrid vehicle according to a first embodiment of the invention.

A first embodiment of the invention will be described with reference to FIG. 1 through FIG. 11. FIG. 1 is a block diagram showing the configuration of a plug-in hybrid vehicle having an external charging capability of being charged with an external power supply according to this embodiment. As shown in FIG. 1, an engine 1, first MG (motor-generator) 2, second MG 3, power distribution mechanism 4, transmission (e.g., a continuously variable transmission, or a reduction gear) 5, and a battery 6 are installed on the vehicle 100.

An output shaft of the engine 1 is connected to the power distribution mechanism 4. The power distribution mechanism 4 is coupled to an input shaft of the transmission 5 and an input shaft of the first MG (motor used for power generation) 2. An output shaft of the transmission 5 is coupled to a differential gear (differential) 8 of wheels (drive wheels) 7, and power of the engine 1 is transmitted to the wheels 7 via the power distribution mechanism 4. The output shaft of the transmission 5 is also coupled to an output shaft of the second MG (motor) 3. The power of the second MG 3 is transmitted to the wheels 7 via the transmission 5.

The power distribution mechanism 4 distributes the power generated by the engine 1 to two paths, which include a first path through which the power of the engine 1 is transmitted to the wheels 7 via the transmission 5, and a second path through which the power generated by the engine 1 is transmitted to the first MG 2 so that electric power is generated by the first MG 2. The power distribution mechanism 4 is controlled by a vehicle control device 30 (which will be described later), and the vehicle control device 30 controls the power transmitted to the first path and the power transmitted to the second path, and the ratio thereof, according to running control using the driving force of the engine 1, and charge/discharge control on the battery 6.

The battery 6 is a power supply device that supplies electric power to the second MG 3. The DC power of the battery 6 is converted by an inverter 9 to AC power, which is then supplied to the second MG 3. The second MG 3 is an AC motor, such as a three-phase synchronous motor, or a three-phase induction motor.

The inverter 9 converts the DC power delivered from the battery 6 to AC power, and delivers the AC power to the second MG 3. The second MG 3 receives the AC power delivered from the inverter 9, and produces kinetic energy for running the vehicle 100. The kinetic energy produced by the second MG 3 is transmitted to the wheels 7 via the transmission 5.

When the brakes are applied to the vehicle 100, such as when the vehicle is decelerated or stopped, the wheels 7 drive the second MG 3 via the transmission 5. The second MG 3 operates as a generator, and converts kinetic energy generated during braking of the vehicle 100 to electric energy (AC power).

The second MG 3 of this embodiment, which is driven with electric power supplied from the battery 6 to operate as a driving source for running the vehicle, also operates as a regenerative brake that converts braking energy to electric power. The power (regenerative energy) generated by the second MG3 is stored in the battery 6 via the inverter 9. The inverter 9 converts the AC power produced by the second MG3 to DC power, and delivers the DC power (regenerative power) to the battery 6.

The first MG 2 is a generator that is rotated/driven with power of the engine 1 so as to generate electric power, and supplies the power thus generated to the battery 6, via the inverter 9. Like the second MG 3, the first MG 2 may be constituted by an AC motor, such as a three-phase synchronous motor or a three-phase induction motor.

The electric power generated by the first MG 2 may be supplied as it is to the second MG3 as electric power for driving the second MG3, or supplied to the battery 6 in which the power is stored. For example, the first MG 2 is controlled according to the SOC (State of Charge) as the amount of charge of the battery 6, the required output of the vehicle 100, etc., and the second MG 3 is controlled to be driven with one or both of the electric power stored in the battery 6 and the electric power generated by the first MG 2.

The engine 1 is a known internal combustion engine, such as a gasoline engine or a diesel engine, which generates power by burning fuel. The engine 1 may be provided with a rotational speed sensor (not shown), which can output the detected rotational speed (or a signal indicative of the rotational speed) of the engine 1 to an engine control device 31.

The engine control device 31 is an engine ECU that controls the engine 1 based on an engine control signal from the vehicle control device 30. The engine control device 31 is connected to the vehicle control device 30 as a main controller that controls the whole of the vehicle. The engine control device 31 controls the fuel injection amount, intake air amount, ignition timing, and so forth, based on detection values of various sensors, such as the rotational speed sensor, so as to operate the engine 1 to achieve a target speed and target torque which are determined by the vehicle control device 30.

The battery control device 32 (corresponding to the second controller of the invention) is a battery ECU that manages the SOC and degradation condition of the battery 6, and controls charging/discharging operation of the battery 6, based on a battery control signal from the vehicle control device 30.

The vehicle 100 of this embodiment includes external charging means for charging the battery 6 with electric power supplied from an external power supply EP. An inlet 11 is provided at a side portion of the vehicle 100. The inlet 11 is a connection port to which a charge cable having a connection plug that couples the vehicle 100 with the external power supply EP is connected. The external power supply EP may be a household power supply (commercial power supply) or a plug-in station.

A charge control device 33 (corresponding to the controller of the invention) is an ECU that performs external charge control. If the charge control device 33 detects that the connection plug extended from the external power supply EP is connected to the inlet 11 (if it receives a signal indicating that the connection plug and the inlet 11 are connected to each other, from the inlet 11 or the connection plug), the control device 33 controls a charger 10 provided between the inlet 11 and the battery 6 so that the battery 6 is charged with electric power supplied from the external power supply EP.

The charger 10 is connected between the inlet 11 and the battery 6, and includes an AC/DC converter that converts AC power supplied from the external power supply EP, to DC power. The charger 10 operates based on a drive signal transmitted from the charge control device 33.

An auxiliary battery 6a is a power supply device that supplies electric power to a vehicle-interior air conditioning system (an inverter, a motor, etc. of an air conditioner), AV equipment, lighting devices, etc. installed on the vehicle 100, for example. The auxiliary battery 6a is a power supply device of a lower voltage than the battery 6, and can be charged with electric power supplied from the battery 6. In this case, a DC/DC converter (not shown) may be connected between the auxiliary battery 6a and the battery 6, and the voltage of electric power of the high-voltage battery 6 may be lowered, for use in charging the auxiliary battery 6a. The auxiliary battery 6a may also be charged with electric power generated by the first MG 2.

The vehicle control device 30, which is the main controller that controls the whole of the vehicle, calculates the required driving force, based on the vehicle required output (power) required by the vehicle 100 as a whole, for example, based on the amount of depression of the accelerator pedal. Then, the vehicle control device 30 performs output control of the engine 1 via the engine control device 31 and input/output control of the battery 6 via the battery control device 32, according to the vehicle required output (power) thus calculated.

The vehicle control device 30 selects a driving source or sources according to operating conditions, and performs running control of the vehicle using driving force from one or both of the engine 1 and the second MG 3. When the accelerator operation amount is small, or the vehicle speed is low, for example, the vehicle control device 30 performs running control of the vehicle 100 using only the second MG 3 as a driving source, without using the driving force from the engine 1 (in a condition where the engine 1 is stopped). In the case where the running control of the vehicle 100 is performed using only the second MG3 as the driving source, too, the engine 1 may be driven so as to cause the first MG 2 to generate electric power.

On the other hand, when the accelerator operation amount is large, or the vehicle speed is high, or the SOC of the battery 6 is small, the vehicle control device 30 performs running control using the engine 1 as a driving source. At this time, the vehicle control device 30 can perform running control of the engine 1 using only the engine 1, or both of the engine 1 and the second MG3, as the driving source or sources.

Each of the vehicle control device 30, engine control device 31, and the battery control device 32, other than the charge control device 33, may be provided by a single control device, or the vehicle control device 30 as the main controller may be configured to have the functions of the respective control devices 31, 32.

Next, the vehicle control device 30 of this embodiment and the vehicle running control of the vehicle 100 will be described in detail. The vehicle control device 30 selects one of a first running mode (CD (Charge Depleting) mode) and a second running mode (CS (Charge Sustaining) mode), and performs running control of the vehicle based on the selected running mode. In the first running mode (CD mode), the vehicle runs positively using electric power stored in the battery 6, until the SOC of the battery 6 is reduced to a given value. In the second running mode (CS mode), the vehicle runs while the battery 6 is charged or discharged so that the SOC of the battery 6 is controlled to a given value. The CS mode and the CD mode may be manually switched.

The CD mode and the CS mode may be selected based on a preset SOC threshold value (threshold value TH) of the battery 6. Namely, the vehicle is allowed to run in the CD mode in a region where the SOC is higher than the threshold value TH, and the vehicle is not allowed to run in the CD mode in a region where the SOC is lower than the threshold value TH, but allowed to run in the CS mode. The vehicle control device 30 can select the CD mode or the CS mode, based on the SOC of the battery 6. When the ignition switch is turned on, and the vehicle control device 30 is started, the vehicle control device 30 determines whether the SOC of the battery 6 is equal to or higher than the threshold value TH, and selects the CD mode when the SOC is equal to or higher than the threshold value TH. If, on the other hand, the SOC of the battery 6 is lower than the threshold value TH, the vehicle control device 30 selects the CS mode.

The CD mode is a running mode in which the vehicle 100 runs only with the driving force of the second MG 3, without maintaining electric power stored in the battery 6. In the CD mode, the engine 1 is basically stopped, and the engine 1 and the second MG 3 are controlled so that the whole vehicle output is ensured only by the driving force of the second MG 3.

In the CD mode in which the running control of the vehicle 100 is performed positively using the power stored in the battery 6, the SOC of the battery 6 is reduced according to power consumption caused by running of the vehicle. Namely, in the CD mode, the battery 6 is charged or discharged from a condition where the SOC is higher than the threshold value TH, until the SOC becomes equal to the threshold value TH, while the SOC of the battery 6 is reduced due to power consumption caused by vehicle running. Thus, in the CD mode, the running control of the vehicle 100 is performed mainly using the motor, by positively using the power stored in the battery 6. Even in the CD mode, when the accelerator operation amount is large, or the vehicle speed is high, vehicle running control using the output of the engine 1 may be performed so as to make up for a shortage of the driving force.

The CS mode is a running mode in which the vehicle control using the driving force of the engine 1 and/or the driving force of the second MG 3 (the power of the battery 6) is performed, so that the power (SOC) stored in the battery 6 does not become lower than a predetermined target value. Namely, if the SOC is reduced to be lower than the target value, the engine 1 is started, and charge control using the first MG2 is performed, so that the SOC that is lower than the target value is increased to be close to the target value, and running control is carried out using the driving force of the engine 1 and/or the driving force of the second MG 3 (the power of the battery 6). In the CS mode, running control is performed using the driving force of the engine 1 and/or the driving force of the second MG 3 while charging or discharging the battery 6 such that the SOC of the battery 6 is controlled to the predetermined target value.

Figure 2:
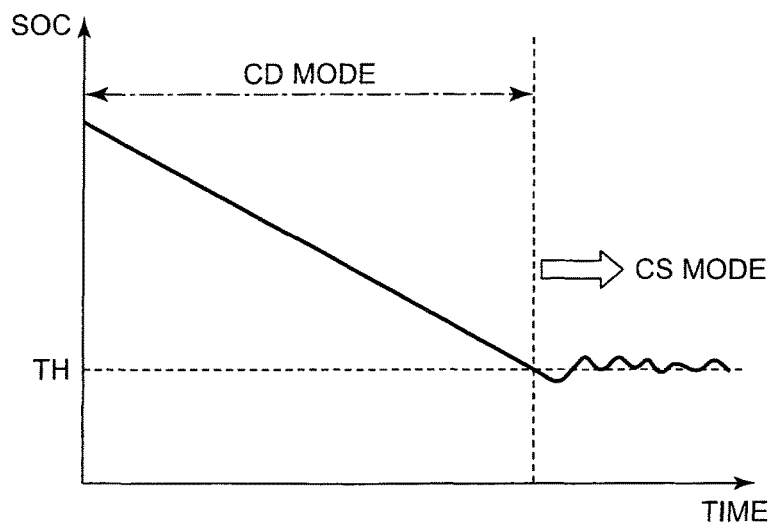
FIG. 2 is a graph useful for explaining running modes of the hybrid vehicle of the first embodiment.

FIG. 2 illustrates vehicle running control of the CD mode and the CS mode according to this embodiment. In FIG. 2, the vertical axis indicates the SOC of the battery 6, and the horizontal axis indicates time.

The vehicle control device 30 determines whether the SOC of the battery 6 detected when the ignition switch is turned on and vehicle running control is started (at the time of start-up) is higher than the threshold value TH, for example. In the example of FIG. 2, it is determined that the SOC of the battery 6 is higher than the threshold value TH, and the CD mode is selected in which the vehicle running control is started. The SOC of the battery 6 is higher than the threshold value TH, and the vehicle running control is started in the CD mode, in the case where the vehicle runs after being charged with the external power supply EP, for example.

The vehicle control device 30 outputs a discharge control signal for the battery 6 according to the vehicle output, to the battery control device 32, and the battery control device 32 causes the battery 6 to supply electric power stored therein to the second MG 3 (to thus discharge the battery 6). Under the running control with the CD mode selected, the SOC of the battery 6 decreases with time.

The vehicle control device 30 monitors the SOC of the battery 6 via the battery control device 32, and determines whether the SOC becomes equal to or lower than a predetermined value (e.g., the threshold value TH). If the SOC of the battery 6 becomes equal to or lower than the threshold value TH, the vehicle control device 30 switches from the CD mode to the CS mode (selects the CS mode).

If the CS mode is selected, the vehicle control device 30 performs running control using the driving force of the engine 1 and/or the driving force of the second MG 3 (electric power of the battery 6), so that the SOC of the battery 6 is controlled to a predetermined target value (e.g., the threshold value VH), namely, the SOC of the battery 6 does not become lower (or higher) than the target value.

In this connection, the threshold value TH is the lower limit value of the SOC under the vehicle running control in the CD mode from the SOC (current SOC) stored in the battery 6, and a transition from the CD mode to the CS mode takes place at the threshold value TH. It is to be noted that the threshold value TH is not a threshold value for performing vehicle running control using only the engine 1 as a driving source, but a threshold value for performing vehicle running control using the engine 1 and/or the second MG 3 as a driving source(s) so that the SOC of the battery 6 does not become lower than the target value. In the example of FIG. 2, the lower limit value of the SOC in the CD mode and the target value to which the SOC is controlled in the CS mode are the same threshold value TH. However, the invention is not limited to this example, but the lower limit value and the target value may be set to individual values. For example, the lower limit value of the SOC for use in the vehicle running control in the CD mode may be set to a first threshold value, and the target value to which the SOC is controlled after being reduced to the first threshold value may be set to a second threshold value that is different from the first threshold value. With the target value thus set to the second threshold value, the running control using the driving force of the engine 1 and/or the driving force of the second MG 3 (the power of the battery 6) can be performed.

Next, referring to FIG. 3, a battery system installed on the plug-in hybrid vehicle 100 of this embodiment will be described. The battery system of this embodiment includes a charge/discharge system that supplies DC power of the battery 6 to the second MG 3 via the inverter 9, and charges the battery 6 with regenerative energy during vehicle braking, and an external charge system that includes temperature regulators for regulating the temperatures of the engine 1 and the battery 6, and charges the battery 6 with electric power from the external power supply EP.

Figure 3:
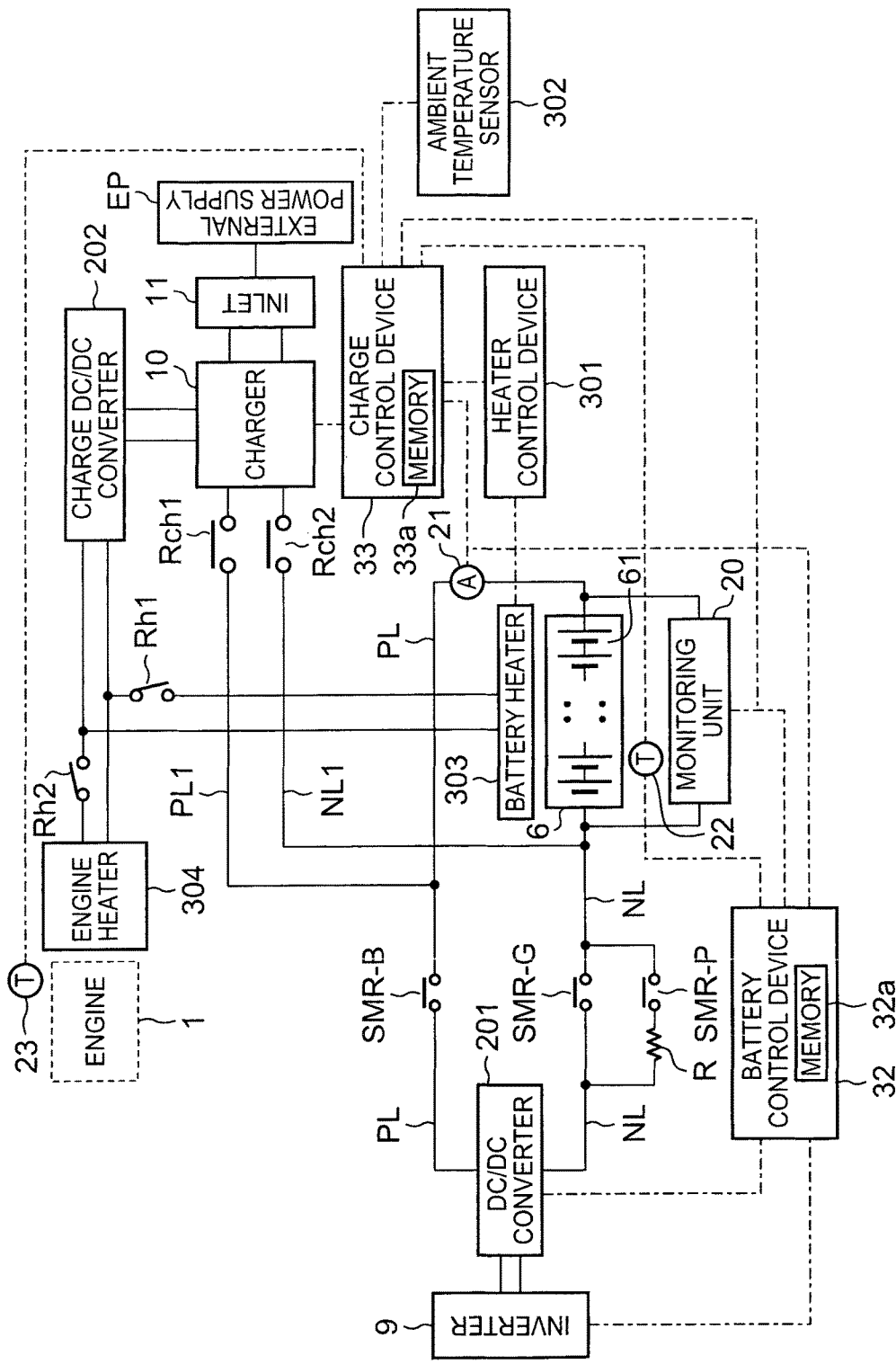
FIG. 3 is a view showing the configuration of a battery system installed on the hybrid vehicle of the first embodiment.

As shown in FIG. 3, the battery 6 is a battery assembly having a plurality of unit cells 61 that are electrically connected in series. As each of the unit cells 61, a secondary cell, such as a nickel-metal-hydride cell or a lithium-ion cell, may be used. Also, an electric double layer capacitor may be used in place of the secondary cell.

The above-indicated plurality of unit cells 61 (power storage elements) are electrically connected in series by a bus bar, to constitute the battery 6. In another example, a plurality of sets of unit cells 61 that are electrically connected in parallel may be connected in series, to constitute the battery 6. The number of the unit cells 61 that constitute the battery 6 may be determined as desired, according to the required output, etc. of the vehicle 100.

In the battery system of this embodiment, a DC/DC converter 201 (booster circuit) is connected between the battery 6 and the inverter 9, and the DC/DC converter 201 connected to the battery 6 is connected to the inverter 9. The DC/DC converter 201 can raise the output voltage of the battery 6 and deliver it to the inverter 9. Also, the DC/DC converter 201 can lower the output voltage from the inverter 9 to the battery 6.

System main relays SMR-B, SMR-G are respectively provided in a positive line PL connected to a positive terminal of the battery 6, and a negative line NL connected to a negative terminal of the battery 6. The system main relays SMR-B, SMR-G are switched between ON and OFF, in response to a control signal from the vehicle control device 30. A system main relay SMR-P and a current-limiting resistor R are connected in parallel with the system main relay SMR-G, and the system main relay SMR-P and the current-limiting resistor R are connected in series.

The system main relays SMR-B, SMR-G permit the battery 6 and the DC/DC converter (inverter 9) to be electrically connected to each other. To connect the battery 6 to the DC/DC converter 201, the vehicle control device 30 initially switches the system main relay SMR-B from OFF to ON, and switches the system main relay SMR-P from OFF to ON. As a result, electric current flows through the current-limiting resistor R, whereby inrush current, which would flow when the battery 6 is connected to the inverter 9, can be curbed or prevented.

The vehicle control device 30 switches the system main relay SMR-P from ON to OFF, after switching the system main relay SMR-G from OFF to ON. In this manner, connection between the battery 6 and the DC/DC converter 201 is completed, and the battery system as shown in FIG. 1 is brought into a startup state (ready-on). The vehicle control device 30 receives information concerning ON/OFF (IG-ON/IG-OFF) of the ignition switch of the vehicle. The vehicle control device 30 starts the battery system, in response to switching of the ignition switch from OFF to ON.

When the ignition switch is switched from ON to OFF, on the other hand, the vehicle control device 30 switches the system main relays SMR-B, SMR-G from ON to OFF. As a result, the battery 6 and the DC/DC converter 201 (inverter 9) are disconnected from each other, and the battery system is brought into a stopped state.

A monitoring unit 20 detects the voltage between the terminals of the battery 6, or detects the voltage of each unit cell 61. The monitoring unit 20 outputs the result of detection to the battery control device 32 (vehicle control device 30). The monitoring unit 20 may detect a voltage of each of the plurality of unit cells 61, or detect a voltage across a set of a given number of unit cells 61 connected in series, as one block. The number of the unit cells 61 included in one block may be set as desired.

The current sensor 21 detects electric current that flows through the battery 6, and outputs the result of detection to the battery control device 32 (vehicle control device 30). In this embodiment, the current sensor 21 is provided in the positive line PL connected to the positive terminal of the battery 6. The position at which the current sensor 21 is provided may be set as appropriate, provided that the current sensor 21 can detect the current flowing through the battery 6. For example, the current sensor 21 may be provided in the negative line NL connected to the negative terminal of the battery 6. Also, two or more current sensors 21 may be used.

A temperature sensor 22 detects the temperature (battery temperature) of the battery 6. The temperature sensor 22 outputs the result of detection to the battery control device 32 (vehicle control device 30). The temperature sensor 22 may be provided at one location of the battery 6, or may be provided at two or more different locations in the battery 6.

When two or more detected temperatures of the battery 6 are used, the minimum value or maximum value of the two or more detected temperatures, or a middle value or average of the two or more detected temperatures, or the like, may be used as appropriate, as the temperature of the battery 6.

As shown in FIG. 3, the battery control device 32 includes a memory 32a. The memory 32a stores respective detection values of the monitoring unit 20, current sensor 21, and the temperature sensor 22, calculation values of the SOC, full charge capacity, etc. calculated using the respective detection values, various kinds of information used in charge/discharge control, and so forth. The memory 32a may consist of individual storage regions externally connected to the battery control device 32. Namely, the memory 32a may be incorporated in or externally connected to the battery control device 32.

The battery control device 32 calculates (estimates) the SOC of the battery 6, based on the voltage value(s) detected by the monitoring unit 20, current value detected by the current sensor 21, and the battery temperature detected by the temperature sensor 22, and performs charge/discharge control of the battery 6, based on the calculated SOC and the estimated value of the full charge capacity. The battery control device 32 may be configured to include respective functions of an SOC estimating unit, a full charge capacity computing unit, etc.

The SOC (state of charge) of the battery 6 represents the ratio of the current charge capacity to the full charge capacity of the battery 6, and the full charge capacity is the upper limit of the SOC. The SOC may be specified from the open circuit voltage (OCV) of the battery 6. For example, the correspondence relationship between the OCV and the SOC of the battery 6 is stored in advance as an OCV-SOC map in the memory 32a. The battery control device 32 calculates the OCV of the battery 6, from the closed circuit voltage (CCV) detected by the monitoring unit 20, and calculates the SOC from the OCV-SOC map.

Since the correspondence relationship between the OCV and the SOC of the battery 6 varies depending on the battery temperature, the OCV-SOC map may be stored in the memory 32a for each battery temperature, and the SOC of the battery 6 may be estimated by selecting an appropriate one from the OCV-SOC maps for respective battery temperatures, according to the battery temperature detected when the SOC is estimated from the OCV of the battery 6.

Accordingly, the battery control device 32 can detect an excessively charged condition or excessively discharged condition of the battery 6, by monitoring the voltage value (CCV) detected by the monitoring unit 20 during charging or discharging. For example, the battery control device 32 may perform charge/discharge control, by restricting charging of the battery 6 so that the calculated SOC does not become higher than a predetermined upper-limit SOC relative to the full charge capacity, or restricting discharging so that the calculated SOC does not become lower than a lower-limit SOC.

The battery control device 32 may be provided for each of the DC/DC converter 201, inverter 9 and the second MG3, and may be configured as one control unit constituted by two or more control devices.

Thus, the battery 6, DC/DC converter 201, inverter 9 and the battery control device 32 constitute a high-voltage charge/discharge system of the battery system which supplies electric power for running the vehicle.

Next, an external charge system of the battery system for charging the battery 6 with electric power from the external power supply EP will be described. The external charge system is started and controlled independently of the charge/discharge system, even in a condition where driving and control the charge/discharge system are stopped. The external charge system performs external charging of the battery 6 with electric power supplied from the external power supply, and temperature regulation using the temperature regulators of the engine 1 and the battery 6.

The charger 10 is connected to the positive line PL to which the positive terminal of the battery 6 and the system main relay SMR-B are connected, and the negative line NL to which the negative terminal of the battery 6 and the system main relay SMR-G are connected.

Charge relays Rch1, Rch2 are respective provided in lines PL1, NL1 that connect the charger 10 with the positive line PL and the negative line NL, respectively. The charge relays Rch1, Rch2 are switched between ON and OFF, in response to a control signal from the charge control device 33.

A charge DC/DC converter 202 (corresponding to the DC/DC converter of the invention) is connected to the charger 10. The charge DC/DC converter 202 is connected to both of a battery heater 303 and an engine heater 304, and is operable to raise the voltage of electric power supplied from the external power supply EP and received from the charger 10, so that the resulting power is delivered to the battery heater 303 and the engine heater 304.

The battery heater 303, which is a heating device for raising the temperature of the battery 6, is driven with external electric power supplied from the external power supply EP. The engine heater 304, which is a heating device for raising the temperature of the engine 1, is driven with external electric power supplied from the external power supply EP.

For example, an electric heater that converts electric energy to thermal energy may be used as the battery heater 303. The battery heater 303 may be provided in direct contact with the battery 6, or may be provided indirectly with a member or space interposed between the heater 303 and the battery 6. Also, two or more electric heaters may constitute one battery heater 303, and heating portions may be provided at two or more locations in the battery 6.

For example, a block heater that converts electric energy to thermal energy may be used as the engine heater 304. The block heater may be provided in a circulation path of a coolant for cooling the engine 1. The engine heater 304 heats the engine coolant, thereby to heat the engine 1. The engine heater 304 may be provided at two or more locations in the circulation path of the engine coolant, and may consist of two or more block heaters.

The charger 10 performs first power supply to supply the battery 6 with external electric power supplied from the external power supply EP, and second power supply to supply the battery heater 303 and the engine heater 304 with the external power. The charger 10 operates according to a control signal of the charge control device 33, and may perform the first power supply and the second power supply at the same time, or start the second power supply after completion of the first power supply.

A switch Rh1 is provided in a power supply line that connects the charge DC/DC converter 202 with the battery heater 303. Also, a switch Rh2 is provided in a power supply line that connects the charge DC/DC converter 202 with the engine heater 304. The switches Rh1, Rh2 are switched between ON and OFF under control of the charge control device 33.

When the switches Rh1, Rh2 are turned ON, the charge DC/DC converter 202 and the battery heater 303 are connected to each other, and the charge DC/DC converter 202 and the engine heater 304 are connected to each other. The battery heater 303 and the engine heater 304 are connected to the common, single charge DC/DC converter 202, and operate with electric power delivered through the second power supply of the charger 10.

The supply of electric power from the charge DC/DC converter 202 to the respective heaters 303, 304 (second power supply) may be carried out at the same time or at different times. For example, the switches Rh1, Rh2 may be turned ON at the same time so that electric power is supplied to both of the battery heater 303 and the engine heater 304, or, after only one of the switches Rh1, Rh2 is turned ON so as to energize one of the heaters, only the other switch Rh1, Rh2 may be turned ON so as to energize the other heater. The timing of turn-on/turn-off of the switches Rh1, Rh2 (the timing of power supply to the heaters) may be set as desired.

A heater control device 301 is connected to the battery heater 303. The heater control device 301 controls a thermistor (temperature sensor) or a thermostat provided in the battery heater 303, so that the temperature of the battery heater 303 detected by the thermistor is kept at a level in the vicinity of a set temperature. For example, electric current applied from the charge DC/DC converter 202 is cut off when the battery heater 303 reaches the set temperature (target temperature), and application of current or energization is resumed when the temperature of the battery heater 303 becomes lower than the set temperature. Thus, energization/de-energization of the battery heater 303 is controlled so that the temperature of the battery heater 303 is kept at a constant temperature.

An ambient temperature sensor 302 detects the ambient temperature or outside air temperature of the vehicle 100, and outputs the result of detection to the charge control device 33. The charge control device 33 also receives detection values from the monitoring unit 20, current sensor 21, and temperature sensors 22, 23.

The temperature sensor 23 detects the temperature of the engine 1 (the temperature of the engine coolant). The temperature sensor 23 outputs the result of detection to the charge control device 33. The temperature sensor 23 may be configured similarly to the temperature sensor 22 for detecting the battery temperature of the battery 6.

Thus, the charger 10, charge DC/DC converter 202, battery heater 303, engine heater 304, charge control device 33, and the heater control device 301 constitute the external charge system of the battery system which charges the battery 6 with electric power supplied from the external power supply EP, and also raises the temperatures of the engine 1 and the battery 6.

FIG. 4 is a flowchart illustrating the processing flow of external charge control including temperature regulation control of the engine 1 and the battery 6 according to this embodiment. The charge control device 33 performs external charge control for charging the battery 6 with electric power supplied from the external power supply EP, and temperature regulation control for supplying electric power from the external power supply EP to the battery heater 303 and the engine heater 304 via the charge DC/DC converter 202 until the external charge control is finished, so as to raise the temperatures of the engine 1 and the battery 6.

The external charge control of this embodiment may include instant charging that is started when triggered by connection of the charge plug connected to the external power supply EP, to the inlet 11, and timer charging that is started at a preset charge start time (including a charge start time calculated from a charge end time and the current time when only the charge end time is set).

As in the example of FIG. 4, the charge control device 33 may be started to start external charging when the charge plug connected to the external power supply EP is connected to the inlet 11. Namely, when the charge plug is connected to the inlet 11 (S101), a charge plug connection signal is generated from the inlet 11 to the charge control device 33. The charge control device 33 is energized when receiving the charge plug connection signal as a trigger, so as to transit from a stopped state to a startup state (S102).

Also, the charge control device 33 may be energized at a charge start time set in advance with a timer (not shown) so as to transit from the stopped state to the startup state, and may start external charging after confirming that the charge plug connected to the external power supply EP is connected to the inlet 11.

The charge control device 33 switches the charge relays Rch1, Rch2 from OFF to ON so as to connect the charger 10 with the battery 6. At this time, as the charge control device 33 is started, the external charge system including the charger 10, charge DC/DC converter 202, and the heater control device 301 is started by energization, to be placed in an operable state. On the other hand, the DC/DC converter 201 and the battery control device 32 of the charge/discharge system are not energized but placed in a non-started (stopped) state. Also, the system main relays SMR-B, SMR-G of the charge/discharge system are in the OFF positions, and the battery 6 and the DC/DC converter (inverter 9) are electrically disconnected from each other.

The charge control device 33 controls the charger 100 to charge the battery 6 with external power supplied from the external power supply EP at a constant current (S103). Also, the charge control device 33 performs temperature regulation control of the engine 1 and the battery 6 (S104).

The charge control device 33 monitors the voltage value of the battery 6 detected by the monitoring unit 20. When the voltage value of the battery 6 reaches a voltage value corresponding to a predetermined SOC upper limit value indicative of completion of charging (S105), the charge control device 33 finishes supply of power from the external power supply EP to the battery 6 (YES in S105), and finishes charging (S106). In the case of timer charging, the charge control device 33 may finish charging when the charge end time comes, irrespective of whether the SOC of the battery 6 has reached the predetermined SOC upper limit value. When the SOC of the battery 6 reaches the SOC upper limit value before the charge end time comes, supply of external power from the charger 10 to the battery 6 is stopped, and charging is finished when the charge end time comes.

Also, the charge control device 33 may finish the temperature regulation control of the engine 1 and the temperature regulation control of the battery 6 at the time when the external charge control is finished. This is because, in the temperature regulation control of this embodiment, the battery heater 303 and the engine heater 304 are operated using external power delivered from the external power supply (EP) to the charger 10. In this connection, even in a condition where charging power is not supplied to the battery 6, the temperature regulation control may be performed by operating the battery heater 303 and the engine heater 304 using external power delivered from the external power supply to the charger 10. Namely, if the external charge system is in a condition where external power can be supplied from the external power supply EP, the temperature regulation control can be performed as it is before the end of external charging, irrespective of whether charging power is supplied to the battery 6.

Figure 5A:
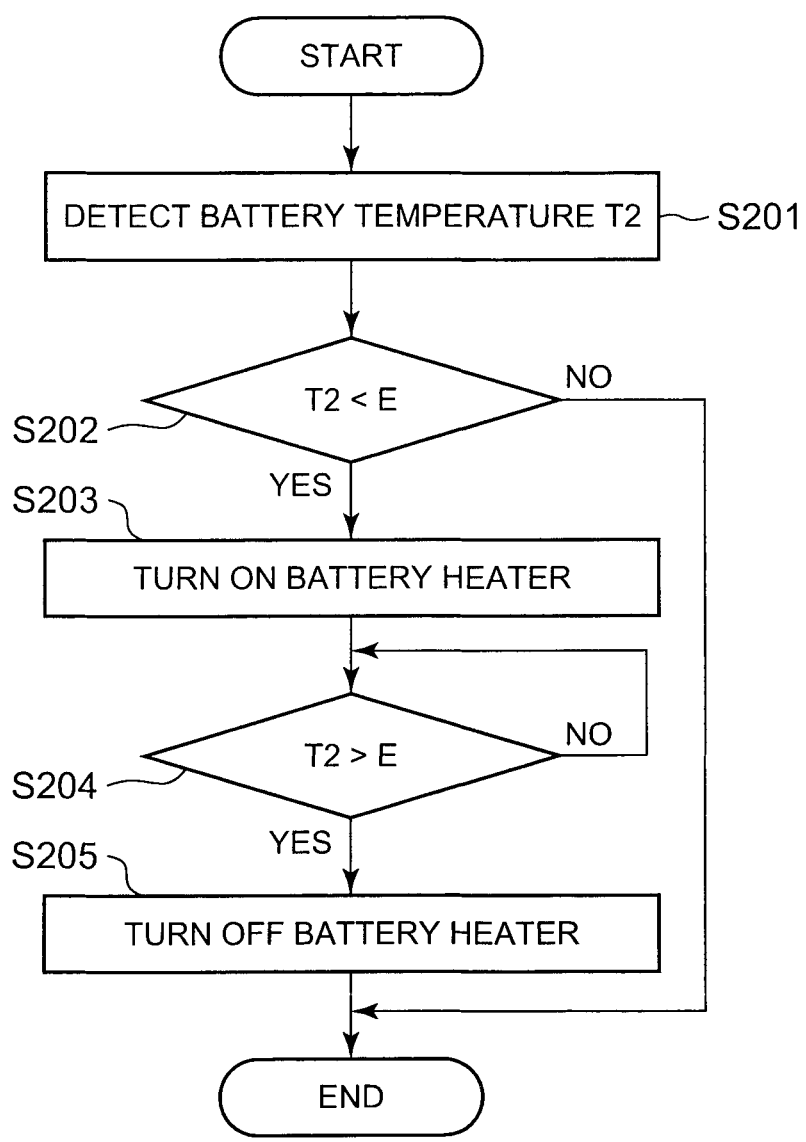
FIG. 5A is a flowchart illustrating the processing flow of temperature regulation control of the battery according to the first embodiment.

FIG. 5A is a flowchart illustrating the detailed flow of the temperature regulation control of the battery 6 in step S104 shown in FIG. 4. As shown in FIG. 5A, the charge control device 33 obtains the battery temperature T2 of the battery 6 from the temperature sensor 22 (S201). The charge control device 33 determines whether the battery temperature T2 is lower than a predetermined temperature E (S202). If the battery temperature T2 is lower than the temperature E, the charge control device 33 switches the switch Rh1 from OFF to ON, and connects the charge DC/DC converter 202 with the battery heater 303, so as to turn on the battery heater 303 (S203).

The charge control device 33 determines whether the battery temperature T2 is higher than the predetermined temperature E (S204). If the battery temperature T2 is higher than the temperature E, the charge control device 33 switches the switch Rh1 from ON to OFF, and disconnects the charge DC/DC converter 202 from the battery heater 303, so as to turn off the battery heater 303 (S205). The charge control device 33 can repeatedly executes step S201 through step S205 shown in FIG. 5A (as long as NO is obtained in step S105 of FIG. 4), until the external charge control is finished. With the external charge control finished, the temperature regulation control of the battery heater 303 (power supply control via the charge DC/DC converter 202) is finished (YES in step S105 of FIG. 4).

The temperature E is a target temperature to which the battery 6 is to be heated, and is set in advance according to output characteristics of the battery 6 which depend on the battery temperature. As the temperature is lower, the internal resistance of the battery 6 is increased, and the output of the battery 6 is reduced. The relationship between the battery temperature and the output is obtained in advance by experiment or from actual measurement values, or the like, and the temperature E is set to the optimum value according to the required output of the battery 6 during vehicle running after external charging.

Figure 5B:
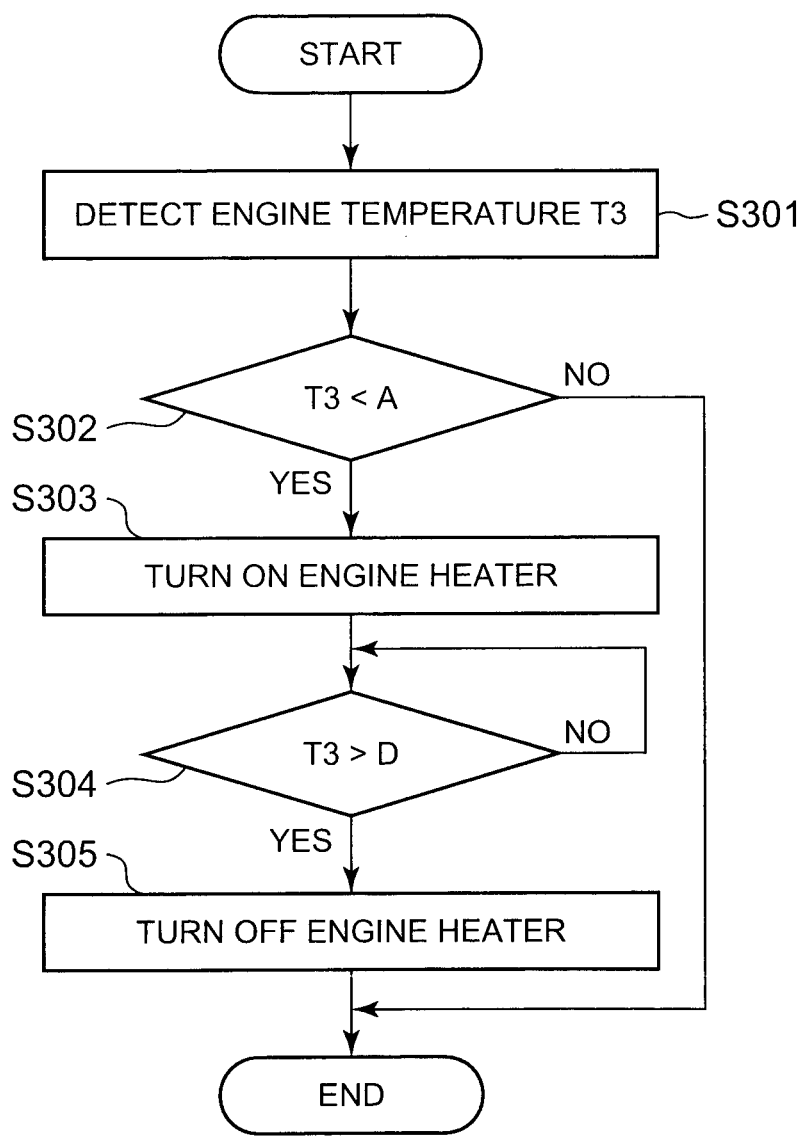
FIG. 5B is a flowchart illustrating the processing flow of temperature regulation control of the engine according to the first embodiment.

FIG. 5B is a flowchart illustrating the detailed flow of the temperature regulation control of the engine 1 in step S104 shown in FIG. 4. The charge control device 33 obtains the engine temperature (the temperature of the engine coolant) T3 from the temperature sensor 23 (S301). The charge control device 33 determines whether the engine temperature T3 is lower than a predetermined temperature A (S302). If the engine temperature T3 is lower than the temperature A, the charge control device 33 switches the switch Rh2 from OFF to ON, and connects the charge DC/DC converter 202 with the engine heater 304, so as to turn on the engine heater 304 (S303).

The charge control device 33 determines whether the engine temperature T3 is higher than a target temperature D (S304). If the engine temperature T3 is higher than the target temperature D, the charge control device 33 switches the switch Rh2 from ON to OFF to disconnect the charge DC/DC converter 202 from the engine heater 304, so as to turn off the engine heater 304 (S305). The temperature A is a target temperature to which the engine 1 is to be heated. At this time, too, the charge control device 33 can repeatedly execute step S301 through step S305 shown in FIG. 5B (as long as NO is obtained in step S105 of FIG. 4), until the external charge control is finished. With the external charge control finished, the temperature regulation control of the engine heater 304 (power supply control via the charge DC/DC converter 202) is finished (YES in step S105 of FIG. 4).

The temperature regulation of the battery 6 using the battery heater 303 and the temperature regulation of the engine 1 using the engine heater 304 may be carried out in parallel at the same time, or at individual times. During the period from the start to the end of charging, temperature regulation control may be performed by, turning on or off the battery heater 303 and/or the engine heater 304 at appropriate times, so as to keep the temperature of the battery 6 and the temperature of the engine 1 at the respective target levels.

Figure 6:
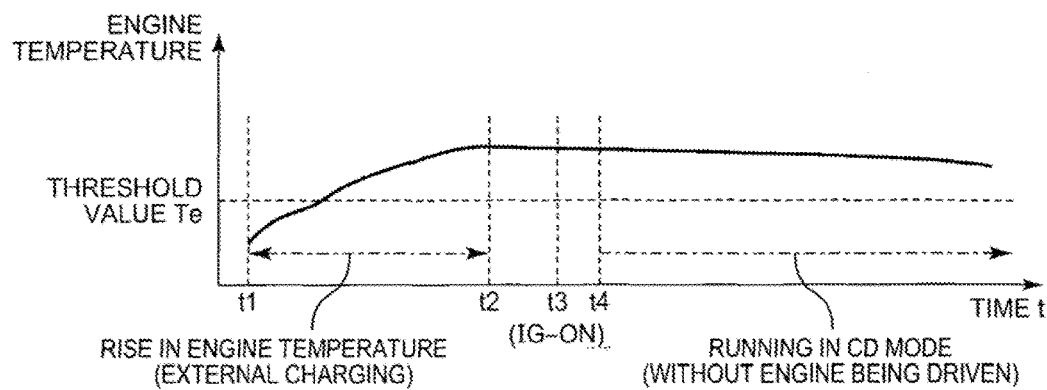
FIG. 6 is a graph showing changes in the temperature of the engine with time during external charging that causes a rise in the engine temperature according to the first embodiment, and changes in the temperature of the engine with time during vehicle running after external charging.
Figure 7:
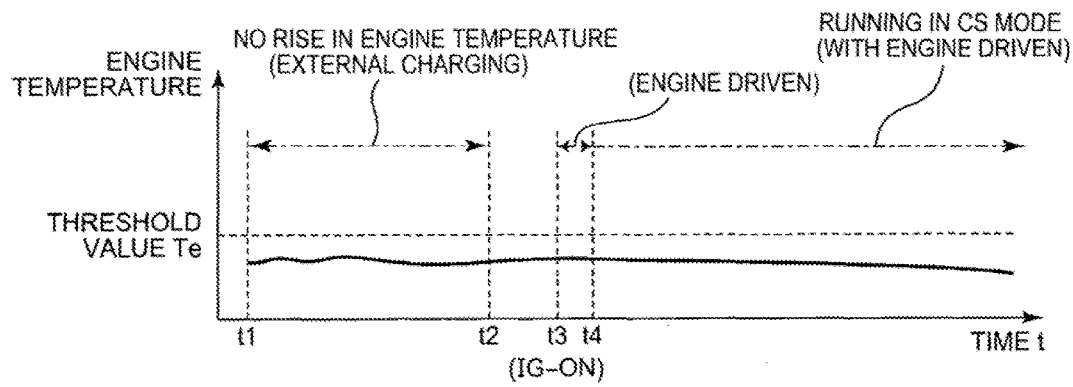
FIG. 7 is a graph showing changes in the temperature of the engine with time during external charging that does not cause a rise in the engine temperature, and changes in the temperature of the engine with time during vehicle running after external charging.

FIG. 6 is a graph showing changes in the engine temperature with time due to external charging when the temperature of the engine is raised according to this embodiment, and changes in the engine temperature with time during vehicle running after external charging. FIG. 7 is a graph showing changes in the engine temperature with time due to external charging when the temperature of the engine is not raised according to this embodiment, and changes in the engine temperature with time during vehicle running after external charging.

If the temperature of the engine 1 becomes lower than a threshold value Te, the vehicle control device 30 forces the engine 1 to be driven (started), to warm up the engine 1. As shown in FIG. 6, the temperature of the engine 1 is lower than the threshold value Te at time t1 that is the charge start time; however, through the temperature regulation control during external charging, the temperature of the engine 1 is elevated to a temperature level that exceeds the threshold value Te, at time t2 that is the charge end time.

In the case where the ignition switch of the vehicle 100 is turned on (IG-ON) at time t3 after external charging is finished, and vehicle running is started at time t4, the vehicle control device 30 performs vehicle running control in the CD mode since the temperature of the engine 1 is higher than the threshold value Te. During vehicle running in the CD mode after time t4, the temperature of the engine 1 is reduced as time passes, since the engine 1 is exposed to the air blowing against the vehicle during running in a non-driven state. However, since the temperature of the engine 1 is higher than the threshold value Te at the start of vehicle running, the engine 1 is not forced to be driven, and the vehicle can be kept running in the CD mode, thus assuring improved fuel efficiency.

Accordingly, as shown in FIG. 5B, the target temperature D to which the engine 1 is heated by the engine heater 304 may be set to a value that is higher than the temperature threshold value Te below which the engine 1 is forced to be driven, in view of the temperature reduction during vehicle running after external charging. Also, the temperature A may be set to the threshold value Te below which the engine 1 is forced to be driven, for example. The details will be described later.

On the other hand, if the temperature regulation control of the engine 1 is not performed during the external charging period from time t1 to time t2, the temperature of the engine 1 is lower than the threshold value Te, after time t2 at which charging is finished.

If the ignition switch of the vehicle 100 is turned on (IG-ON) at time t3 after external charging is finished, the vehicle control device 30 forces the engine 1 to be driven since the temperature of the engine 1 is lower than the threshold value Te. Even after the vehicle starts running at time t4, the vehicle control device 30 performs vehicle running control in the condition where the engine 1 is driven, for example, performs vehicle running control in the CS mode. In this case, even if the SOC of the battery 6 that has been externally charged is higher than the CS mode threshold value, the vehicle running control cannot be performed in the CD mode, and the fuel efficiency may deteriorate.

Thus, the power storage system of this embodiment includes the external charge system that raises the temperature of the engine 1 to be higher than the threshold value below which the engine 1 is forced to be driven, so that the vehicle runs, after external charging, in the CD mode in which the vehicle 100 runs only with the driving force of the second MG 3, and the power of the battery 6 is positively used until the SOC of the battery 6 is reduced to the predetermined value. The external charge system also raises the temperature of the battery 6 to a level commensurate with the required output of the battery 6 during vehicle running after external charging.

In the external charge system, the common, single charge DC/DC converter 202 operates to supply electric power to two heaters, i.e., the battery heater 303 and the engine heater 304, and the single charge control device 33 performs the external charge control of the battery 6 and the temperature regulation control including power supply control for supplying power to the battery heater 303 and the engine heater 304.

Therefore, the number of the charge DC/DC converter and the control device (controller) which operate during external charging is minimized, so that power consumption needed to operate the charge DC/DC converter and the control device during external charging can be reduced. Also, a power loss that occurs at the time of voltage conversion of the charge DC/DC converter is reduced, as compared with the case where DC/DC converters are provided for the battery heater 303 and the engine heater 304, respectively, and the amount of electric power supplied from the external power supply EP to the battery 6 can be increased by the amount of the power loss.

Accordingly, the power consumption needed to operate the charge DC/DC converter and the control device, and the power loss at the time of voltage conversion during external charging, can be reduced, and the amount of external power (external charging cost) needed to operate the battery heater 303 and the engine heater 304 using the external power so as to raise the temperatures of the battery 6 and the engine 1, while charging the battery with the external power, can be curbed or reduced.

The power storage system of this embodiment is configured such that the charger 10 is connected between the battery 6 and the system main relays SMR-B, SMR-G, and respective devices of the external charge system are provided independently of the charge/discharge system. Therefore, the external charge control and the temperature regulation control can be performed, in a condition where the system main relays SMR-B, SMR-G are in the OFF states, and the DC/DC converter 201 and the battery control device 32 of the charge/discharge system are not started.

Accordingly, the external charging and the temperature regulation control of the engine, etc. can be performed by starting only the external charge system including the charger 10 and the charge DC/DC converter 202. Thus, the amount of power consumed by the charge/discharge system that supplies power from the battery 6 to the second MG 3 can be curbed or reduced, and the external charging cost can be curbed or reduced.

In particular, it is preferable to perform external charging for charging the battery 6 with power of the external power supply EP, in a short charging time at a low cost. In order to perform external charging in a short time, the power storage system of this embodiment may operate two heaters, i.e., the battery heater 303 and the engine heater 304, using a part of external power supplied from the external power supply, so as to raise the temperatures of the battery 6 and the engine 1, at the same time that the battery 6 is charged with the external power.

As described above, the amount of power with which the battery 6 is charged is reduced, by the amount of power consumed by the battery heater 303 and the engine heater 304. However, since the number of the charge DC/DC converter and the control device that operate during external charging is minimized, the power consumed for operating the DC/DC converter and the control device, and the power loss at the time of voltage conversion during external charging, are reduced; consequently, the battery 6 can be charged with increased external power during the charging period. Therefore, the external charging cost can be curbed or reduced.

Where the external power supply EP is a low-voltage system, such as a commercial power supply (AC100, AC200), the external charge system becomes a battery system of lower voltage than the charge/discharge system; therefore, the voltage conversion ratio of the output voltage to the input voltage of the charge DC/DC converter 202 is lower than that of the DC/DC converter 201 of the charge/discharge system. For example, the power loss at the time of voltage conversion is reduced, as compared with the case where high-voltage power stored in the battery 6 is reduced in voltage by the DC/DC converter 201 and delivered to the battery heater 303 and the engine heater 304.

The charge control device 33 and charge DC/DC converter 202 of the external charging system may be driven with electric power supplied from the auxiliary battery 6a, or electric power supplied from the external power supply EP. When they are driven with power supplied from the external power supply EP, the external charging cost can be curbed or reduced, since the number of the charge DC/DC converter and the control device that operate during external charging is minimized.

Even when the charge control device 33 and the charge DC/DC converter 202 are driven with power supplied from the auxiliary battery 6a, the external charging cost can be curbed or reduced. Namely, since the auxiliary battery 6a is charged, using electric power of the battery 6 that is externally charged as described above, the amount of power consumed by the charge control device 33 and the charge DC/DC converter 202 driven with power from the auxiliary battery 6a becomes a part of the amount of power consumed by the battery 6. Accordingly, if the power consumed by the auxiliary battery 6a is reduced, the battery 6 can be charged with a larger amount of electric power to be used for vehicle running. Since the number of the charge control device 33 and the charge DC/DC converter 202 driven with power from the auxiliary battery 6a is minimized, the external charging cost can be curbed or reduced.

Next, the process of setting the target temperature in the temperature regulation control of the engine 1 will be described in detail. As shown in the example of FIG. 6, during vehicle running in the CD mode, the engine 1 is exposed to the air blowing against the running vehicle in a condition where the engine 1 is not driven; therefore, the temperature of the engine 1 is reduced as time passes. Accordingly, if the temperature of the engine 1 is reduced to be lower than the threshold value Te, due to the air blowing against the vehicle during running, the engine 1 is forced to be driven, and the vehicle cannot keep running in the CD mode.

Thus, in this embodiment, the target temperature D to which the engine 1 is to be heated (which will be called "heating target temperature D") is set so that the temperature of the engine 1 does not become lower than the threshold value Te below which the engine 1 is forced to be driven, until the vehicle running ends, while the vehicle is running in the CD mode after completion of charging using the external power supply.

Figure 8:
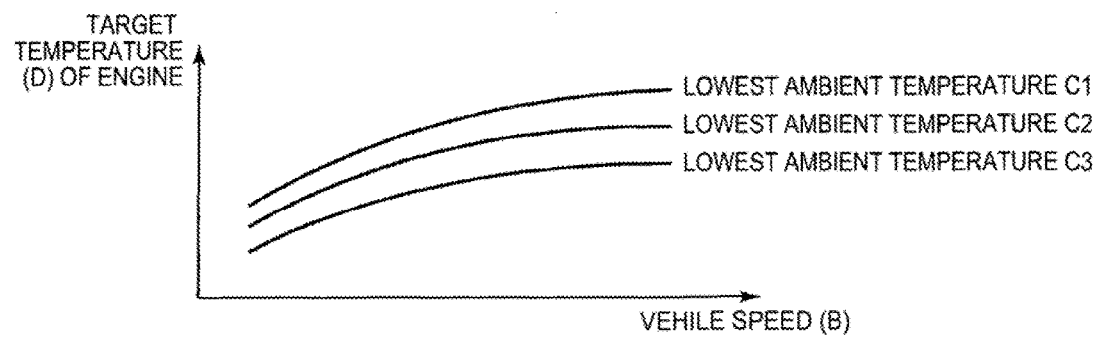
FIG. 8 is a graph indicating the relationships among the vehicle speed, lowest ambient temperature, and the target temperature of the engine, according to the first embodiment.

FIG. 8 is a graph showing the relationship between the vehicle speed of the vehicle 100 and the heating target temperature D of the engine 1. The temperature of the engine 1 is reduced during running of the vehicle, in different manners depending on the air blowing against the vehicle, which varies with the vehicle speed. In this embodiment, the heating target temperature D of the engine 1 is set based on the amount of reduction of the temperature according to the vehicle speed.

For example, the vehicle can keep running in the CD mode after completion of charging using the external power supply, until the SOC of the battery 6 after completion of charging with the external power supply is reduced to the CS mode threshold value. Therefore, the vehicle is able to run in the CD mode, using electric power based on a difference between the SOC of the battery 6 after completion of charging with the external power supply, and the SOC of the CS mode threshold value. Thus, if the amount of reduction of the temperature according to the vehicle speed is grasped in advance, relative to the running distance (CD mode running distance) over which the vehicle can keep running in the CD mode, which corresponds to the amount of charge after completion of charging with the external power supply, the relationship between the vehicle speed and the heating target temperature can be specified as shown in FIG. 8.

As shown in FIG. 8, the heating target temperature D is set to be higher as the vehicle speed is higher, and the heating target temperature D is set to be lower as the vehicle speed is lower. In other words, the heating target temperature D is set to a higher value, with an addition of the temperature that decreases by a larger degree as the vehicle speed is higher. The amount of reduction of the temperature according to the vehicle speed can be determined in advance by experiment, or the like, and the value obtained by adding the amount of reduction of the temperature according to the vehicle speed to the threshold value Te below which the engine 1 is forced to be driven can be specified in advance as the heating target temperature D as in the example of FIG. 8.

The heating target value D that varies with the speed of the vehicle 100 may be set according to the maximum speed of the vehicle 100 set in advance under vehicle running control in the CD mode, for example. Namely, the heating target temperature D is set, in view of the amount of reduction of the temperature of the engine 1 when the vehicle keeps running at the maximum speed, in relation to the running distance over which the vehicle can keep running in the CD mode, which corresponds to the amount of charge after completion of charging with the external power supply. With the heating target temperature D set in this manner, the engine 1 is prevented from being forced to be driven during running of the vehicle.

The heating target temperature D is set to different values depending on the lowest ambient temperature. When the ambient temperature is low during running of the vehicle, the amount of reduction of the temperature according to the vehicle speed is increased. In the example of FIG. 8, the correspondence relationship between the vehicle speed and the heating target temperature is specified for each lowest temperature of the ambient temperature.

Figure 9:
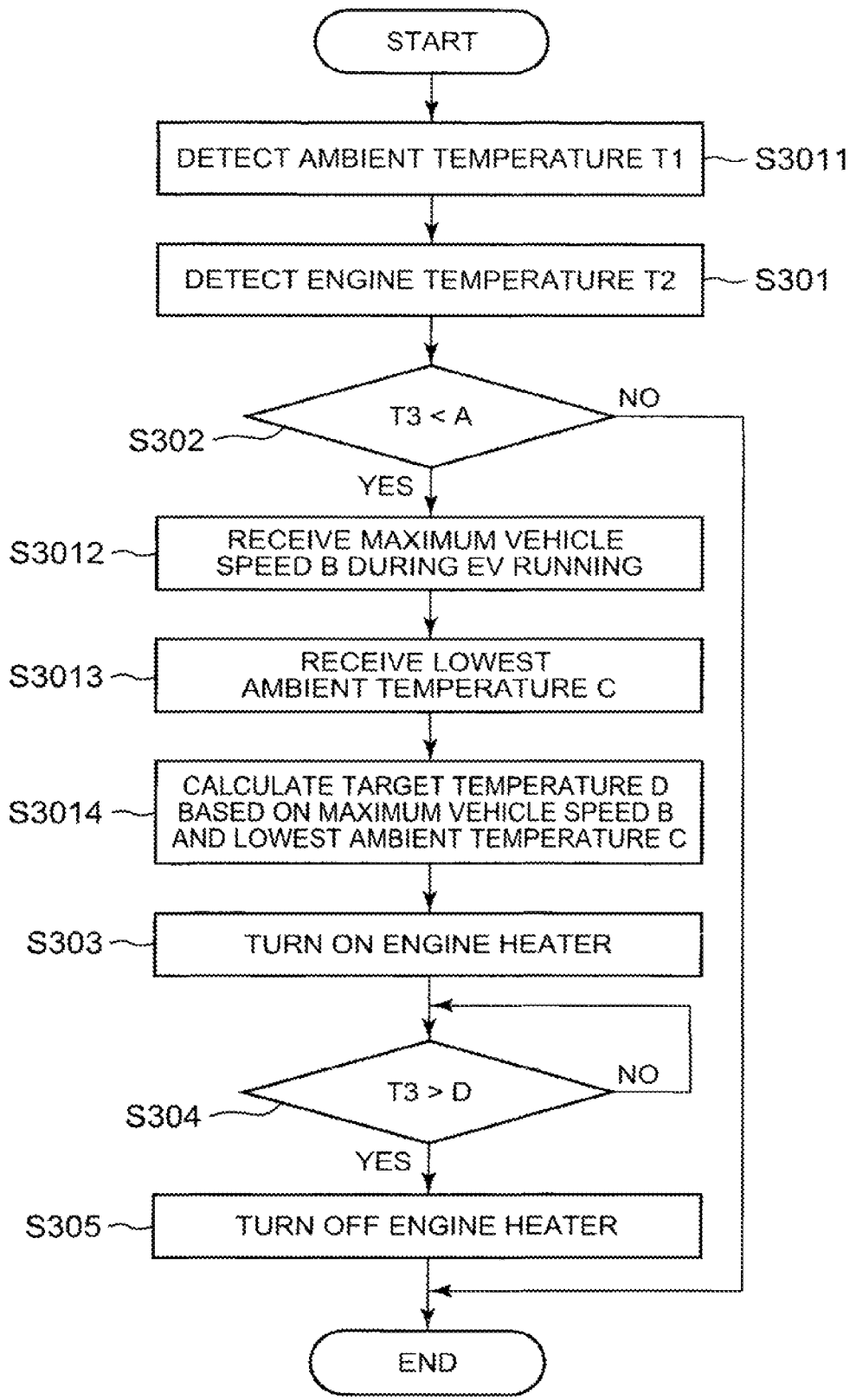
FIG. 9 is a flowchart illustrating the processing flow of temperature regulation control of the engine including a process of setting a target temperature of the engine according to the maximum vehicle speed and the lowest ambient temperature in the first running mode (CD mode)

FIG. 9 is a flowchart illustrating the processing flow of the temperature regulation control of the engine 1 including the process of setting the target temperature of the engine according to the maximum vehicle speed and the lowest ambient temperature under the vehicle running control in the CD mode. The example of FIG. 9 corresponds to the temperature regulation control of the engine 1 shown in FIG. 5B.

As shown in FIG. 9, the charge control device 33 obtains the ambient temperature T1 of the vehicle 100 from the ambient temperature sensor 302 (S3011). The ambient temperature T1 thus obtained is stored in the memory 33a. The charge control device 33 also obtains the engine temperature (the temperature of the engine coolant) T3 from the temperature sensor 23 (S301).

The charge control device 33 determines whether the engine temperature T3 is lower than the predetermined temperature A (e.g., the threshold value Te) (S302), and sets the heating target temperature D of the engine 1 when the engine temperature T3 is lower than the temperature A. The charge control device 33 receives the maximum speed B of the vehicle 100 set in advance under vehicle running control in the CD mode and stored in the memory 33a, and the lowest ambient temperature C (S3012, S3013). The charge control device 33 then calculates the heating target temperature D, from the correspondence relationship between the vehicle speed and the heating target temperature for each lowest ambient temperature, which relationship is stored in the memory 33a and shown in FIG. 8, using the maximum speed B and the lowest ambient temperature C received as input parameters.

In this connection, the lowest ambient temperature set in advance according to the region or country in which the vehicle 100 runs, for example, may be used as the lowest ambient temperature C. Also, the lowest ambient temperature (for example, the lowest ambient temperature in the latest several days, or the average value of the lowest ambient temperatures of the latest several days) calculated from the information of the ambient temperature T1 obtained by the ambient temperature sensor 302 may be used. These items of information may be stored in the memory 33a.

The charge control device 33 switches the switch Rh2 from OFF to ON, so as to connect the charge DC/DC converter 202 with the engine heater 304, and turn on the engine heater 304 (S303). The charge control device 33 starts supplying power to the engine heater 304, and performs temperature regulation control of the engine 1, using the calculated heating target temperature D as the set value.

The charge control device 33 determines whether the engine temperature T3 is higher than the target temperature D (S304). If the engine temperature T3 is higher than the target temperature D, the charge control device 33 switches the switch Rh2 from ON to OFF, so as to disconnect the charge DC/DC converter 202 from the engine heater 304, and turn off the engine heater 304 (S305).

In step S302, the heating target temperature D may be used as the temperature A based on which the temperature of the engine 1 is controlled by means of the engine heater 304. In this case, the operations of steps S3012 to S3014 may be performed between step S301 and step S302. In the example shown in FIG. 9, too, the charge control device 33 can repeatedly execute steps S3011, S301, S302, S3012 to S3014, S303 to S305 shown in FIG. 9, until the external charge control is finished (as long as NO is obtained in step S105 of FIG. 4). With the external charge control thus finished, the temperature regulation control of the engine heater 304 (the power supply control via the charge DC/DC converter 202) is finished (YES in step S105 of FIG. 4).

Figure 10:
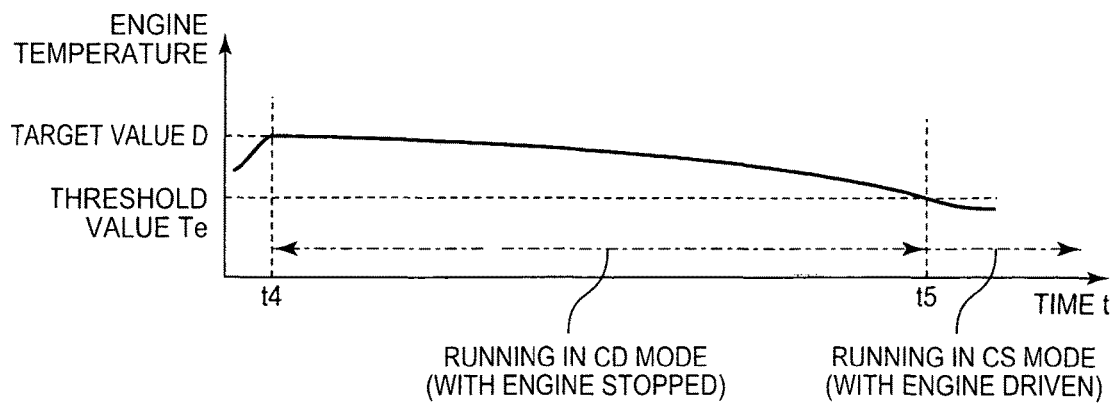
FIG. 10 is a graph showing the target temperature of the engine set in the first embodiment, and changes in the engine temperature with time during vehicle running after external charging.

FIG. 10 is a graph showing the heating target temperature D of the engine 1 and changes in the engine temperature during vehicle running after external charging. As shown in FIG. 10, at the start of vehicle running in the CD mode after external charging, the temperature of the engine 1 is controlled to the heating target value D set in view of the temperature reduction during vehicle running; therefore, the temperature of the engine 1 is not reduced down to the threshold value Te below which the engine 1 is forced to be driven, during vehicle running in the CD mode according to the SOC after external charging, and the vehicle can keep running in the CD mode without causing the engine 1 to be forced to be driven.

Figure 11:
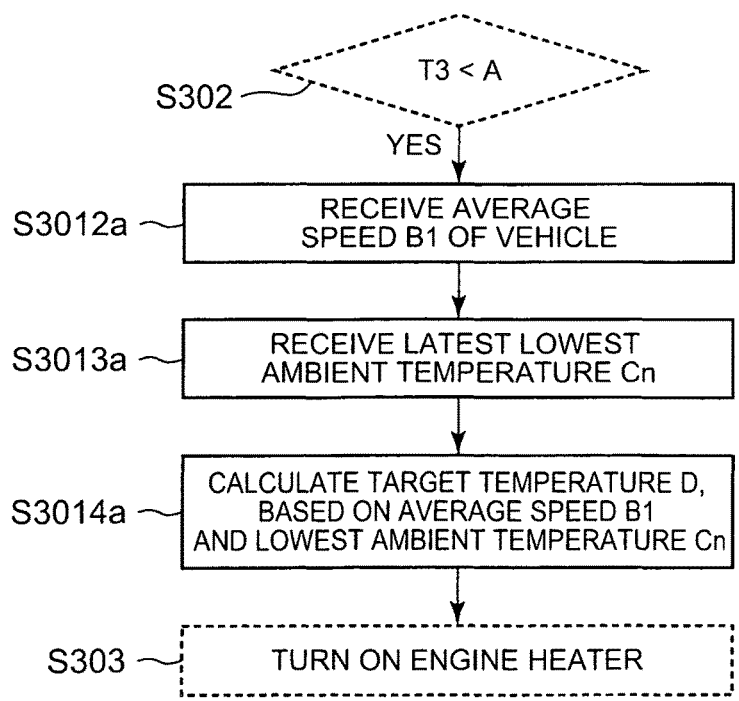
FIG. 11 is a flowchart illustrating a process of setting a target temperature according to the average speed calculated from a history of past vehicle running and the lowest ambient temperature.

FIG. 11 is a flowchart illustrating the processing flow in the case where the heating target temperature D of the engine 1 is set using the average speed calculated from a history of past running of the vehicle 100. In the example of FIG. 9, the heating target temperature D is set in view of the amount of temperature reduction during vehicle running, using the maximum speed B of the vehicle 100 set in advance under the vehicle running control in the CD mode. However, the heating target temperature D may be set from actual measurement values relating to vehicle running, which values are calculated from the vehicle running history of the vehicle 100.

As shown in FIG. 11, the charge control device 33 receives the average speed B1 of the vehicle 100 calculated from the past running history stored in the memory 33a, and the lowest ambient temperature Cn calculated from the information of the ambient temperature T1 obtained by the ambient temperature sensor 302 (for example, the lowest ambient temperature in the latest several days, or the average value of the lowest temperatures in the latest several days) (S3012a, S3013). The charge control device 33 calculates the heating target temperature D (S3014a), from the correspondence relationship between the vehicle speed and the heating target temperature for each lowest ambient temperature, which relationship is stored in the memory 33a and shown in FIG. 9, using the average speed B1 and the lowest ambient temperature Cn as input parameters (S3014a).

Thus, the heating target temperature D is set, in view of the temperature reduction during vehicle running after external charging, so that, during vehicle running in the CD mode after completion of charging with the external power supply, the temperature of the engine 1 does not become lower than the threshold value Te below which the engine 1 is forced to be driven, until the vehicle running ends. Therefore, the engine is less likely or unlikely to be forced to be driven, and the fuel efficiency can be improved. Also, since the heating target temperature is set by predicting the amount of temperature reduction of the engine 1, the amount of electric power supplied to the engine heater 304 can be minimized in accordance with the heating target temperature for curing the forced driving of the engine 1 during vehicle running.

The heating target temperature D of the engine 1 is set, based on the vehicle running history or the actual measurement values detected by the ambient temperature sensor 302, so that the heating target temperature D that makes it possible to curb forced driving of the engine 1 during vehicle running after external charging can be set with high accuracy. With the heating target temperature D thus set with high accuracy, the amount of electric power used for raising the temperature of the engine 1 can be reduced, and the external charging cost can be curbed or reduced.

What is claimed is:

1. A power storage system comprising:
    an external power supply; and
    a hybrid vehicle including
        an engine,
        a motor,
        a battery that supplies electric power to the motor, the battery being configured to be charged with the electric power supplied from the external power supply,
        an engine heater that rises a temperature of the engine,
        a battery heater that rises a temperature of the battery,
        a first DC/DC converter configured to convert a voltage of electric power supplied to the first DC/DC converter, and the first DC/DC converter being configured to output the electric power to the engine heater and the battery heater respectively,
        a charger connected to the external power supply, and the charger configured to output the electric power supplied from the external power supply to the battery and the first DC/DC converter, and
        a first controller configured to perform external charge control and temperature regulation control, the external charge control being a control to charge the battery with the electric power supplied from the external power supply, the temperature regulation control being a control to supply the electric power supplied from the external power supply to the engine heater and the battery heater via the first DC/DC converter until the external charge control is finished, thereby to rise temperatures of the engine and the battery.

2. The power storage system according to claim 1, wherein the hybrid vehicle further includes:
    a second DC/DC converter configured to convert a voltage of electric power supplied from the battery, and the second DC/DC converter configured to output the electric power to an inverter connected to the motor; and
    a second controller configured to perform charge/discharge control of the battery via the second DC/DC converter, wherein
    the charger is connected between a system main relay and the battery, and the system main relay permits connection between the second DC/DC converter and the battery, and
    the first controller performs the external charge control and the temperature regulation control, when i) the system main relay is in an OFF state and ii) the second DC/DC converter and the second controller are not started.

3. The power storage system according to claim 1, wherein the first controller sets a target temperature of the engine based on an amount of temperature reduction of the engine which is specified in advance according to a vehicle speed during vehicle running, such that the temperature of the engine does not become lower than a predetermined threshold value at which the engine is required to be driven to raise the temperature of the engine, until the vehicle running ends after completion of charging with the external power supply.

4. The power storage system according to claim 3, wherein:
    the hybrid vehicle runs in one of a first running mode and a second running mode, the first running mode is a running mode using the motor more often than the engine for tractive power while charging or discharging the battery until an amount of charge of the battery becomes equal to a predetermined value such that the amount of charge of the battery is reduced due to power consumption caused by vehicle running, the second running mode is a running mode using the engine and the motor while charging or discharging the battery such that the amount of charge of the battery becomes equal to a predetermined target value; and the first controller sets the target temperature, based on the amount of temperature reduction associated with a maximum vehicle speed specified in advance in the first running mode.

5. The power storage system according to claim 3, wherein the first controller sets the target temperature, based on the amount of temperature reduction corresponding to an average vehicle speed calculated from a history of past vehicle running.

6. The power storage system according to claim 3, wherein the first controller sets the target temperature, based on one of the amount of temperature reduction, an estimated value of a lowest ambient temperature set in advance, and an actual value of the lowest ambient temperature detected by a temperature sensor.

* * * * *